US 9,113,145 B2

(12) United States Patent
Peng

(10) Patent No.: US 9,113,145 B2
(45) Date of Patent: Aug. 18, 2015

(54) CONTRAST MATCHING FOR STEREO IMAGE

(75) Inventor: Honghong Peng, San Jose, CA (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 742 days.

(21) Appl. No.: 13/221,039

(22) Filed: Aug. 30, 2011

(65) Prior Publication Data

US 2012/0242665 A1 Sep. 27, 2012

Related U.S. Application Data

(60) Provisional application No. 61/467,554, filed on Mar. 25, 2011.

(51) Int. Cl.
| | |
|---|---|
| *G06T 11/20* | (2006.01) |
| *H04N 13/00* | (2006.01) |
| *G06T 5/40* | (2006.01) |
| *H04N 1/407* | (2006.01) |
| *G06T 5/00* | (2006.01) |

(52) U.S. Cl.
CPC ............ *H04N 13/0025* (2013.01); *G06T 5/009* (2013.01); *G06T 5/40* (2013.01); *H04N 1/4072* (2013.01); *G06T 2207/10021* (2013.01)

(58) Field of Classification Search
USPC ......................................................... 345/426
See application file for complete search history.

(56) References Cited

U.S. PATENT DOCUMENTS

| | | | |
|---|---|---|---|
| 2003/0212758 A1* | 11/2003 | Anderson et al. ............. | 709/217 |
| 2007/0030365 A1 | 2/2007 | Jerdev | |
| 2007/0120972 A1* | 5/2007 | Kim et al. ........................ | 348/51 |
| 2008/0037897 A1* | 2/2008 | Chiang et al. ................. | 382/273 |
| 2008/0304087 A1* | 12/2008 | Shin et al. ...................... | 358/1.6 |
| 2010/0165010 A1* | 7/2010 | Baik et al. ..................... | 345/690 |
| 2010/0239187 A1* | 9/2010 | Yea et al. ...................... | 382/298 |

* cited by examiner

*Primary Examiner* — Ke Xiao
*Assistant Examiner* — Kyle Zhai
(74) *Attorney, Agent, or Firm* — Kendall P. Woodruff

(57) ABSTRACT

Apparatus and a method for matching contrast between images of a stereo image pair. A first contrast value corresponding to first pixel information of first image is determined and a second contrast value corresponding to second pixel information of second image is determined. The first and second contrast values are compared and the image having the lower contrast value is selected for compensation. A tone mapping function is generated and applied to the pixel information corresponding to the selected image for generating compensated image pixel information corresponding to the selected image.

13 Claims, 8 Drawing Sheets

106
OVERLAP REGION

CONTRAST MATCHING FOR STEREO IMAGE

CROSS REFERENCE TO RELATED APPLICATIONS

This application claims priority of U.S. Provisional Patent Application Ser. No. 61/467,554, filed Mar. 25, 2011, which is incorporated herein by reference.

FIELD

The subject invention concerns contrast matching for a stereo image and in particular to applying compensation to at least one image of a stereo image pair.

BACKGROUND

A stereoscopic image creates the illusion that the picture viewed is three-dimensional. One way to create depth perception in the brain is to provide the eyes of the viewer with two different images, representing two perspectives of the same object, with a minor deviation similar to the perspectives that both eyes naturally receive in binocular vision. When the two images of a stereopair are viewed separately by the left and right eyes, they blend together in the perception of the viewer to form a single visual image.

BRIEF DESCRIPTION OF THE DRAWINGS

For a more complete understanding of the nature and benefits of the invention, reference should be made to the following detailed description taken in conjunction with the accompanying drawings, in which.

DETAILED DESCRIPTION

Figure 1A:
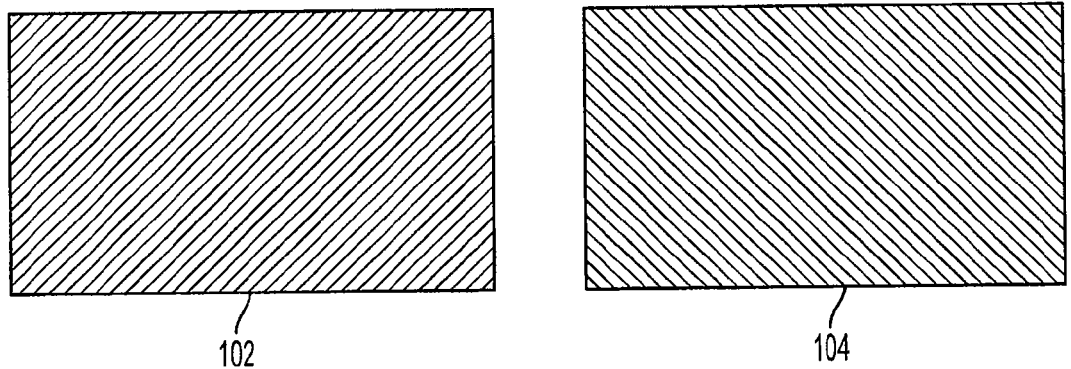
FIG. 1A illustrates a left image and a right image of a stereo image pair.
Figure 1B:
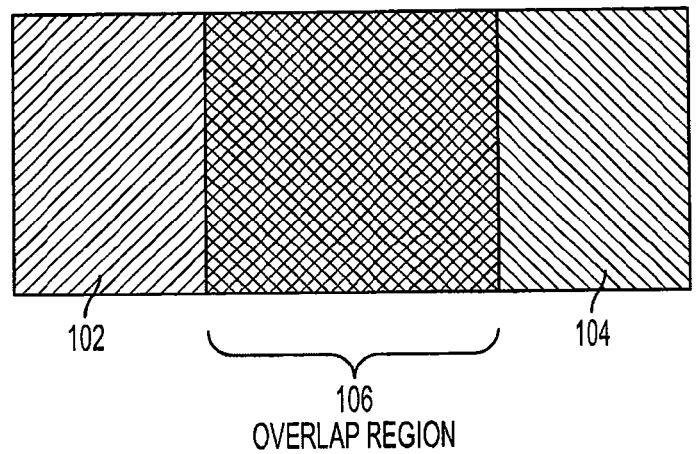
FIG. 1B illustrates the left and right images of FIG. 1A in an example configuration with each image overlapping a portion of the other image.

There is shown in FIG. 1A a representation of a left image 102 and a right image 104 of a stereo image pair. The images 102, 104 are presented to the eyes of a viewer so the left image 102 and the right image 104 are viewed separately by the left and right eyes of the viewer. The overlap region 106 shown in FIG. 1A is a portion of each image 102, 104 that corresponds to a portion of the other image 104, 102.

The left and right images 102, 104 correspond to a single frame of a sequence of frames of images and are presented in a manner for the images 102, 104 to blend together in the perception of the viewer. For human stereo vision, the tone contrast of images perceived by both eyes is desirably close. For a two-camera stereo imaging system, however, this similarity in tone may be hindered, for example, by disparity in one or both of optical system and sensor response.

The viewer's left eye sees the left image 102 and the viewer's right eye sees the right image 104. Ideally, the overlap region 106 portion of each image 102, 104 would be very similar. There may exist, however, differences in contrast between left and right images 102, 104 due to factors such as optical system variation (e.g., one of the lenses may be more contaminated than the other), sensor response variations, and scene variation captured by a different camera (e.g., one camera may capture more glare than the other due to the incident light angle).

A difference in tone contrast between left and right images may be a source of distraction to a person viewing the stereo image pair. According to an embodiment of the invention, the difference in tone contrast between the left and right images of a stereo pair is reduced to an extent (e.g., within a tolerable level) so that it does not pose a distraction to a person viewing such images.

According to an example embodiment of the invention, the tone contrast of the lower contrast image of a stereo pair is moved closer to or matched to that of higher contrast image. First, for the stereo image pair, a measurement metric is used to identify and select the lower contrast image of the stereo image pair. Then, tone contrast compensation is applied to the selected image, which is considered to have lower image quality, by calculating a tone mapping function based on the luminance histograms of both images of the stereo image pair.

Figure 2:
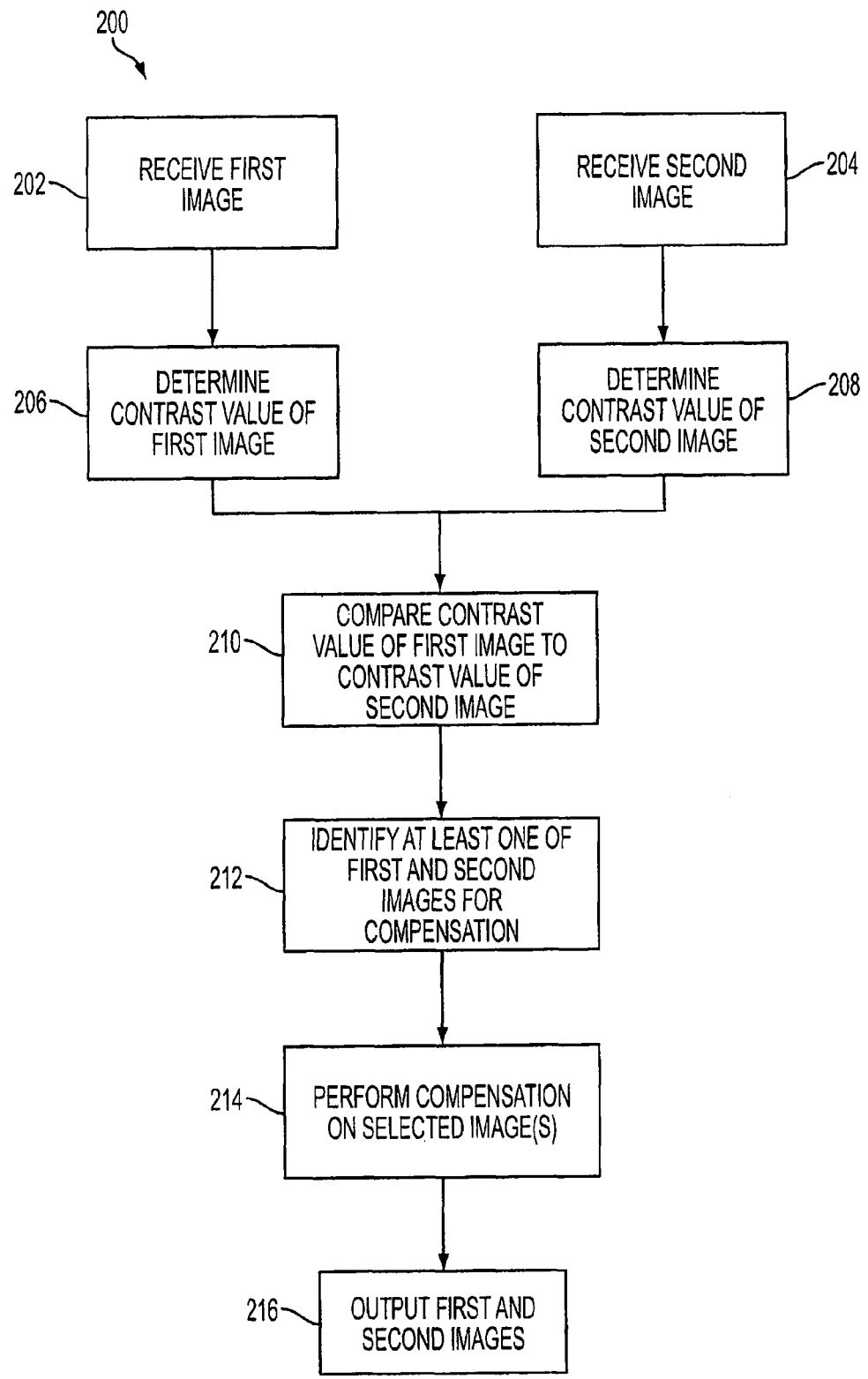
FIG. 2 is a flow chart of a method according to an example embodiment of the invention.

There is shown in FIG. 2 is a flow chart 200 illustrating a method according to an example embodiment of the invention for processing a first image and a second image. The images are processed to reduce the tone contrast between first and second images. The method is described with reference to the data flow diagram 300 shown in FIG. 3 illustrating the operation of an image processor according to an example embodiment of the invention.

Figure 3:
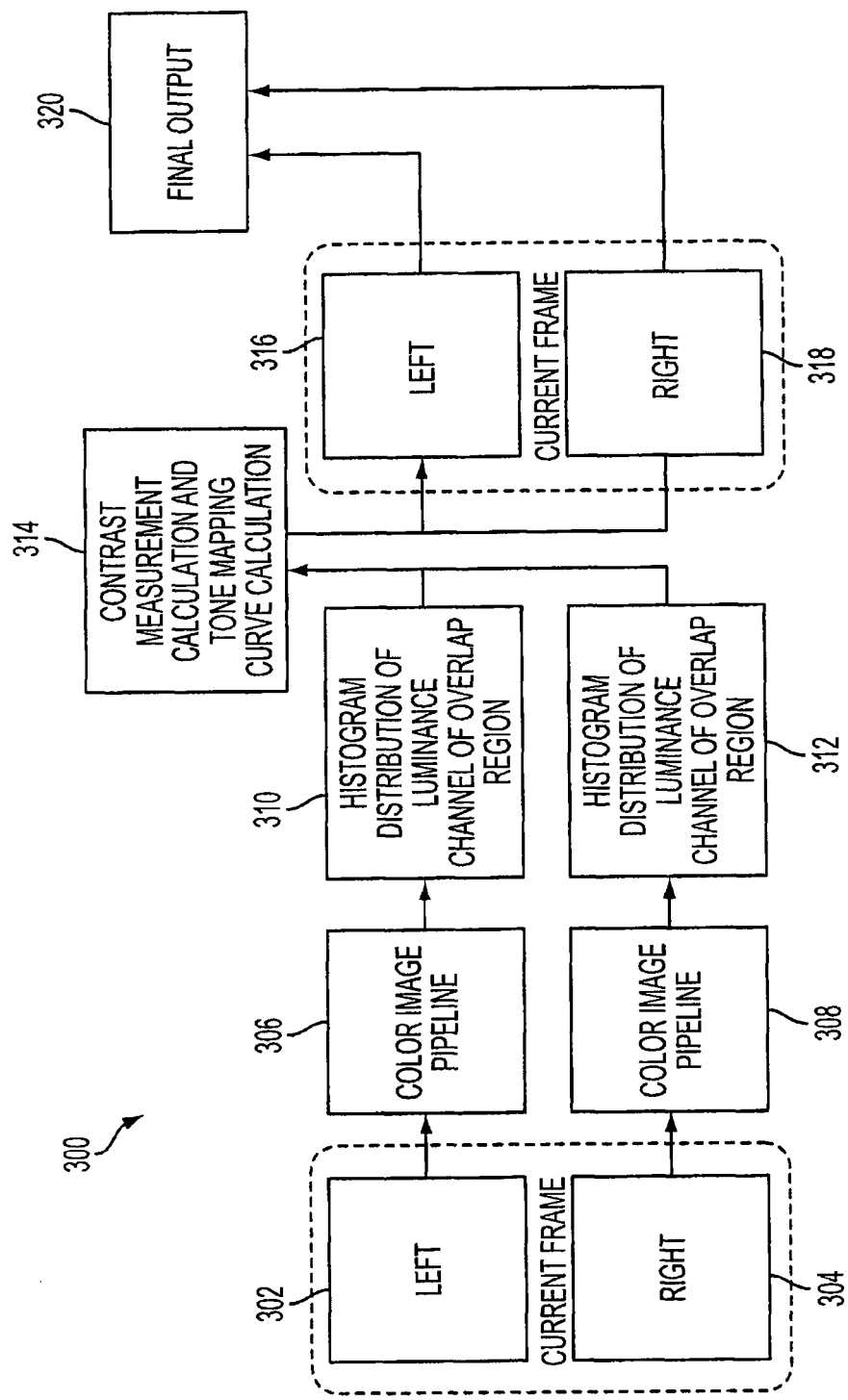
FIG. 3 is a data flow diagram illustrating a method according to an example embodiment of the invention.

Pixel information corresponding to the first image 302 is received in step 202 from a first image generator (not shown in FIG. 3). Second pixel information corresponding to the second image 304 is received in step 204 from a second image generator. The first and second pixel information may be received from an image generator (not shown in FIG. 3) via a respective image pipeline 306, 308.

In the example embodiment shown in FIG. 3, the first and second images are left and right images, respectively. A contrast value corresponding to at least a portion of the first image 302 is determined in step 206 based on the first pixel information and a contrast value corresponding to at least a portion of the second image 304 is determined in step 208 based on the second pixel information. The contrast values may be based on the entire first and second images 302, 304. In another embodiment, for example, the contrast values may be based on a portion of the respective first and second images 302, 304, such as a portion corresponding to the overlap region 106.

In an example embodiment, the contrast values corresponding to the first and second images 302, 304 are determined based on respective luminance histograms of the first and second images 302, 304. The contrast values are determined in block 314 based on the luminance histograms provided by blocks 310, 312.

In an example embodiment, the contrast values corresponding to the respective first and second images 302, 304 are generated according to the following formula:

$$ContrastValue = -\text{sum}\left[\left(\frac{H(I)}{\text{sum}(H(I))}\right) * \log\left(\frac{H(I)}{\text{sum}(H(I))}\right)\right] \quad [1]$$

In the formula above, the term "H" is the luminance channel histogram and "I" is the luminance channel image of the corresponding first and second images 302, 304. Formula [1] above is an example of a formula for determining contrast of an image and the scope of the invention is not limited to a particular method for determining contrast. The term contrast value as used herein may be broadly interpreted to encompass contrast metrics, that is, calculated values that may be indicative of, related to, or representative of the contrast of an image but not necessarily the actual contrast of the image.

In an example embodiment, as illustrated by blocks 310, 312 in FIG. 3, the contrast values of the respective first and second images 302, 304 are determined based on the luminance histograms of the overlap regions of the respective images 302, 304. In an example embodiment, the overlap region is defined based on the assumption that the imager is imaging objects at a distance from 1 m to infinity.

In step 210, the contrast value of the first image 302 is compared to the contrast value of the second image 304. Based on the result of the comparison, at least one of the first and second images 302, 304 is selected, in step 212, for compensation in step 214. In an example embodiment, if the result of the comparison performed in step 210 is within a certain threshold, the system may not select any of the first and second images 302, 304 for compensation. In other words, in an example embodiment if there is a slight or no difference between the contrast values or metrics corresponding to the first and second images 302, 304, none of the first and second images 302, 304 may be identified in step 212 nor compensated in step 214.

In one example embodiment, one of the first and second images 302, 304 is selected for compensation. In another example embodiment, both of the first and second images 302, 304 are selected for compensation. The process of selecting of one or more of the images 302, 304 according to an example embodiment of the invention is further described below.

In step 214, the selected image(s) are compensated to reduce contrast level differences between the images. In step 216, once the compensation is applied to the selected image(s), the first and second images 316, 318 including the compensated image pixel information corresponding to the selected image(s), are send to an output 320 of the image processor. The process for generating a compensated image(s) according to an example embodiment of the invention is further described below.

Figure 4:
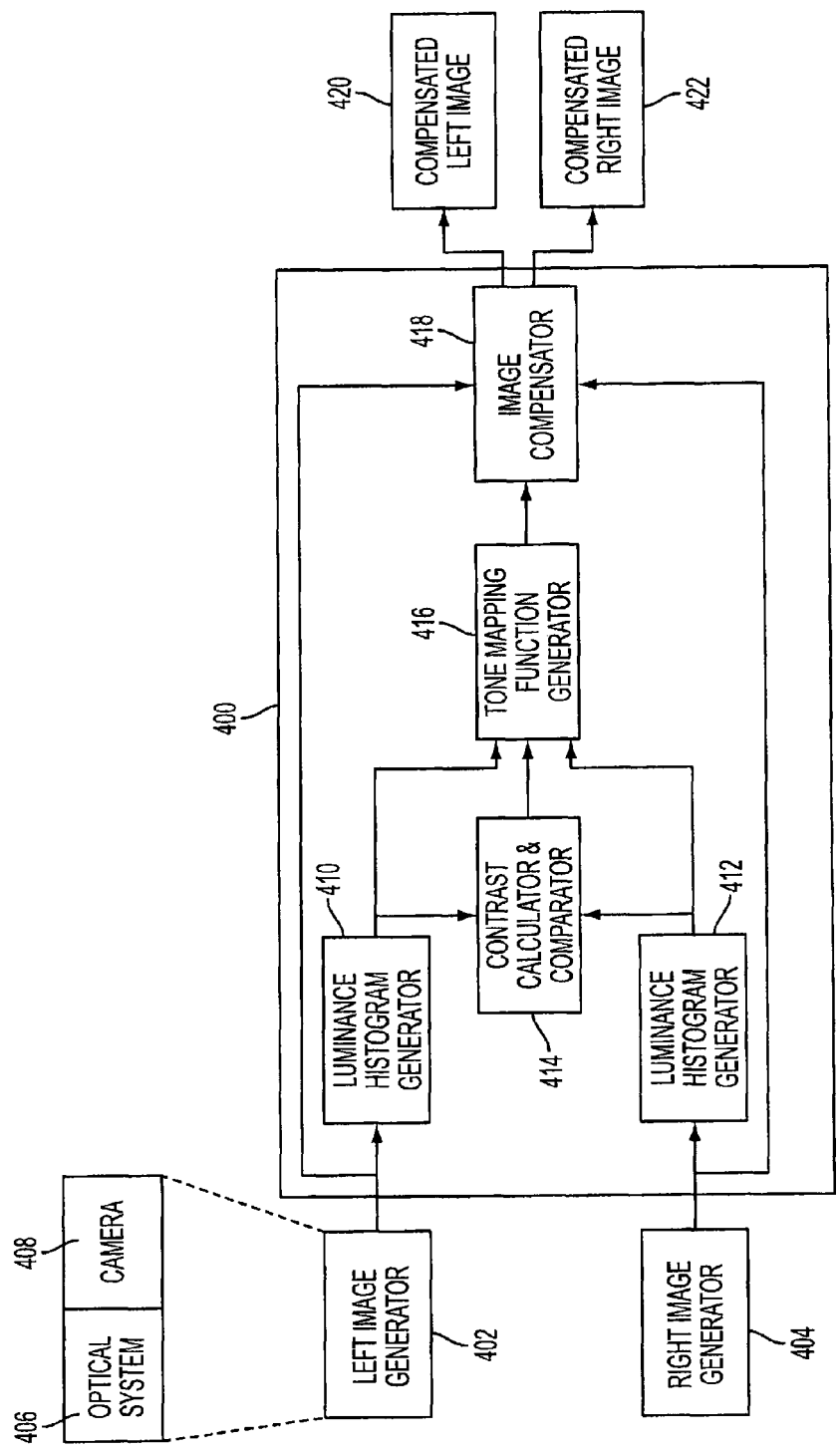
FIG. 4 is block diagram of a system according to an example embodiment of the invention.

There is shown in FIG. 4 an example image processor 400 according to an example embodiment of the invention for performing the method described above. The image processor 400 receives pixel information corresponding to a left image and a right image directly or indirectly from a left image generator 402 and a right image generator 404, respectively. The image generators may include, for example, an optical system 406 and a camera 408, for generating the pixel information corresponding to the images as illustrated in FIG. 4 for the left image. The right image generator 404 may similarly include an optical system and camera or other apparatus (not shown) for generating an image.

The system 400 includes luminance histogram generators 410, 412 for generation a luminance histogram corresponding to the left and right image pixel information. The system 400 is shown with two separate histogram generators 410, 412. The system 400 may be implemented with a single luminance histogram generator that generates luminance histograms corresponding to both the left and right images.

A contrast calculator and comparator 414 is coupled to the luminance histogram generators 410, 412 for receiving the luminance histograms corresponding to the left and right images and generating a contrast value corresponding to each of the left and right images. The contrast value may be generated in an example embodiment according to the formula [1] above. The contrast calculator and comparator 414 compares the contrast value corresponding to the left image to the contrast value corresponding to the right image and, based on the result of the comparison, selects at least one of the left and right images for compensation. The term contrast calculator as used herein may encompass devices to determine contrast metrics as described above.

In an example embodiment, the contrast calculator and comparator 414 compares the contrast values corresponding to the left and right images and selects the image having the lower contrast value. Thus, in an example embodiment that uses formula [1] above, the image having a corresponding ContrastValue lower than the ContrastValue of the other image is the image that is selected for compensation.

The contrast calculator and comparator 414 outputs an indication of which image was selected to the tone mapping function generator 416. The tone mapping function generator 416 generates a tone mapping function to be applied to the selected image for reducing the difference in contrast between the left and right images. In the example embodiment shown in FIG. 4, the tone mapping function generator 416 is coupled to the luminance histogram generators 410, 412 for receiving the luminance histograms corresponding to the left and right images and uses the luminance histograms for generating a tone mapping function.

According to an example embodiment of the invention, the system is modeled to substantially match the luminance histogram of the selected image to the luminance histogram of the other image. This is illustrated by the formula [2] below.

$$H_{Compensate\, dImage} = H(T(I_{imageoflow\, contrast})) \quad [2]$$

In the formula above, the term "H" is the luminance channel histogram, "I" is the luminance channel image of the selected image, and "T" is the tone mapping function. The above formula [2] represents a model of the desired objective (not necessarily a calculation) that may be implemented by example embodiments according to the invention.

According to an example embodiment of the invention, the tone mapping function generator 416 generates a tone mapping function according to the following equation [3].

$$T = \underset{T}{\operatorname{argmin}}\left(\frac{CDF_{targetimageofhighcontrast} -}{(CDF_{correctedcandidateimageoflowcontrast}\,(T(I_{lowcontrastimage})))}\right) \quad [3]$$

In the formula above, the term "T" is the tone mapping function, the term "CDF" is the cumulative distribution function, and "I" is the luminance channel image of the selected image. Formulas [2] and [3] use nomenclature (i.e., "lowcontrastimage") assuming that the contrast calculator and comparator 414 selects one of the left and right images 402, 404 as having lower contrast relative to the other image. An example where both images are selected is described below.

The image compensator 418 receives the tone mapping function from the tone mapping function generator 416 and receives pixel information corresponding to a left image and a right image (or only the selected image), directly or indirectly, from a left image generator 402 and a right image generator 404, respectively. The image compensator 418 generates and outputs compensated left image pixel information 420 and/or compensated right image pixel information 422.

In another example embodiment, the contrast calculator and comparator 414 calculates the contrast values corresponding to the left and right images and selects both images for compensation. Rather than compensating one image to have a contrast level closer to that of the other image, in this example embodiment both images are compensated to have a contrast level closer to a contrast level between the respective contrast levels of the left and right images.

In such an example embodiment, the contrast calculator and comparator generates an intermediate luminance histogram corresponding to an intermediate contrast value between the contrast values corresponding to the left and right images. The intermediate luminance histogram may be generated, for example, by a bin-by-bin averaging of the luminance histograms corresponding to the left and right image.

The tone mapping function generator 416 receives the intermediate luminance histogram and the luminance histograms corresponding to the left and right images for generating two tone mapping functions. A first tone mapping function $T_{left}$ is for generating compensated pixel information corresponding to the left image and a second tone mapping function $T_{right}$ is for generating compensated pixel information corresponding to the right image. According to an example embodiment of the invention, the tone mapping function generator 416 generates tone mapping functions $T_{left}$ and $T_{right}$ according to the following equations [4] and [5].

$$T_{left} = CDF_{intermediate}^{-1}(CDF_{leftimage}(I_{leftimage})) \quad [4]$$

$$T_{right} = CDF_{intermediate}^{-1}(CDF_{rightimage}(I_{rightimage})) \quad [5]$$

The $CDF_{intermediate}^{-1}$ in the formulas [4] and [5] above is the inverse cumulative distribution function of the intermediate luminance histogram. The image compensator 418 receives the tone mapping functions from the tone mapping function generator 416, applies the first tone mapping function $T_{left}$ to pixel information corresponding to the left image for generating and outputting compensated left image pixel information 420 and applies the second tone mapping function $T_{right}$ to pixel information corresponding to the right image for generating and outputting compensated right image pixel information 422.

The left and right images correspond to a frame that is in a sequence of image frames. In the example embodiment described above, the compensated image(s) for one frame was generated based on pixel information corresponding to left and right images in that same frame. According to another example embodiment, the compensated pixel information for an image in a subject frame is generated based on pixel information corresponding to one or more images in one or more frames, referred to as a "set" of frames, preceding the subject frame.

Figure 5:
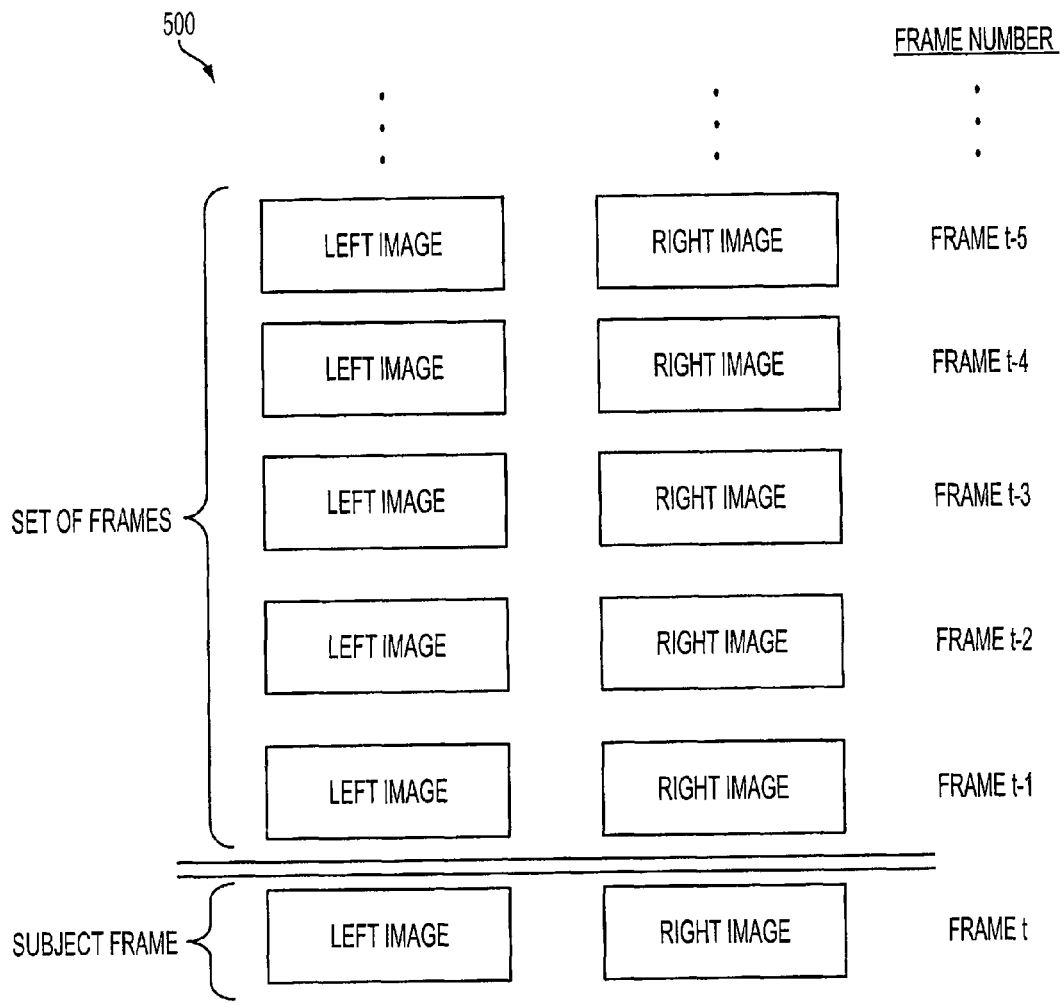
FIG. 5 is a diagram illustrating a sequence of frames according to an example embodiment of the invention.

A sequence of frames 500 is illustrated in FIG. 5. Each frame includes a left image and a right image. The "subject" frame is designated as frame "t" and the preceding frames are designated as frames "t-1," "t-2," etc. In the example illustrated in FIG. 5, the set of frames includes five frames preceding the subject frame.

Figure 6:
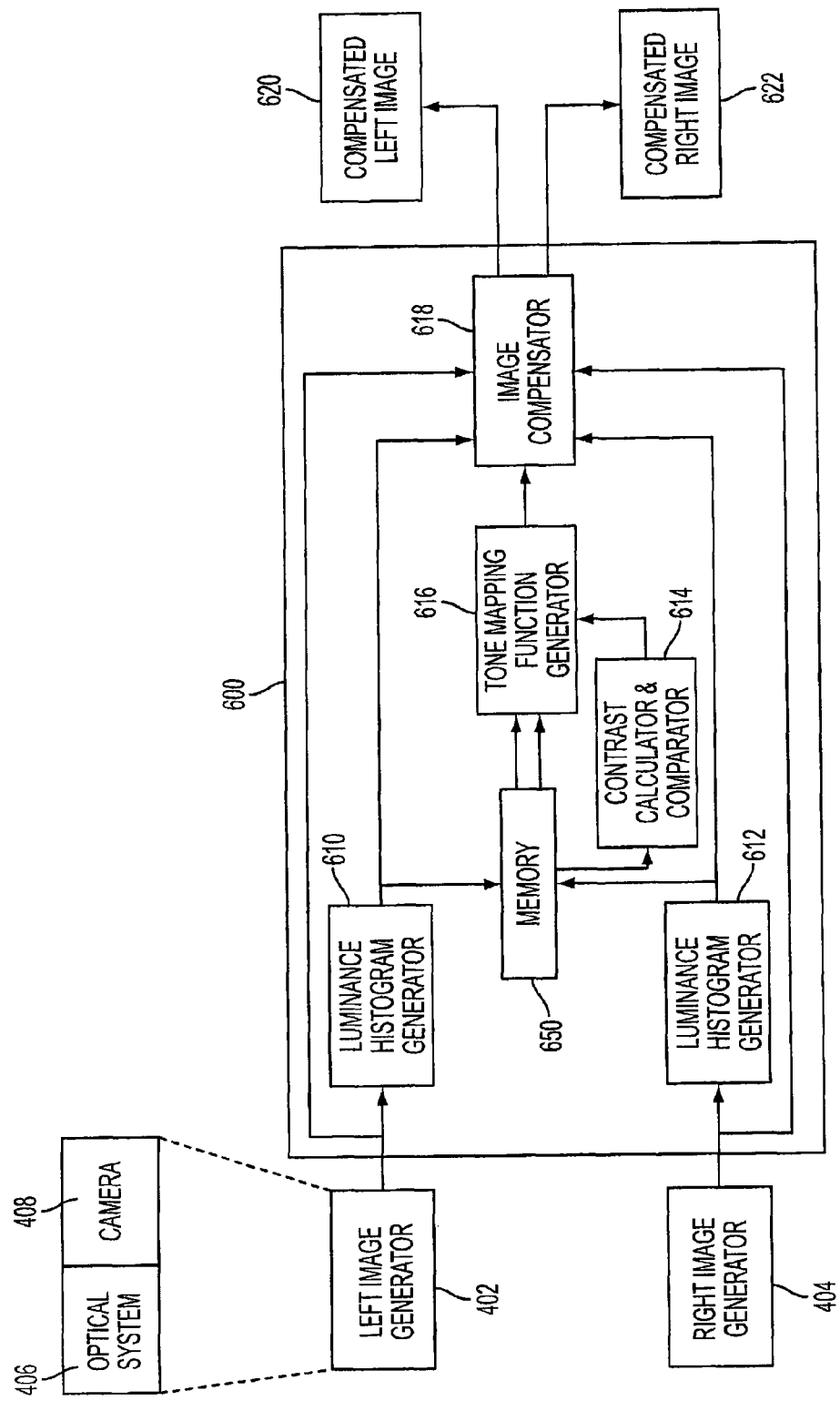
FIG. 6 is block diagram of a system according to an example embodiment of the invention.

There is shown in FIG. 6 an image processor 600 according to an example embodiment of the invention for generating compensated pixel information for an image in a subject frame based on pixel information corresponding to one or more images in one or more frames preceding the subject frame. The image processor 600 receives pixel information corresponding to a left image and a right image directly or indirectly from a left image generator 402 and a right image generator 404, respectively, as described above regarding FIG. 4. The system 600 includes luminance histogram generators 610, 612 for generating luminance histograms corresponding to the left and right image pixel information, respectively. The system 600 is shown with two separate histogram generators 610, 612. The system 600 may be implemented with a single luminance histogram generator that generates luminance histograms corresponding to both of the left and right images.

The luminance histograms corresponding to the left and right images of each frame in a set of frames and in a subject frame are stored in the memory 650. The contrast calculator and comparator 614 is coupled to the memory 650 for receiving the luminance histograms and determines whether to compensate either the left image or the right image of the subject frame responsive to the left and right luminance histograms of the one or more frames in the set of frames. In such case, the contrast calculator and comparator 614 may determine which image, left or right, to select, either before or while a luminance histogram corresponding to the subject image is being generated. In an example embodiment, the contrast calculator and comparator 614 determines whether to compensate either the left image or the right image also based on the left and right luminance histograms of the subject frame. In an example embodiment, the contrast calculator and comparator 614 determines whether to compensate either the left image or the right image of the subject frame responsive to the image information corresponding to the overlap regions of the images in the one or frames used for making such determination.

The luminance histograms of multiple frames (i.e., multiple frames in the set of frames preceding the subject frame, multiple frames in the set of frames preceding the subject frame and the subject frame, or one frame preceding the subject frame and the subject frame) may be used to select an image for compensation. In an example embodiment, the frame to be compensated is selected based on the ContrastValue formula [1] above. In such case, the luminance histograms of the multiple left frames may be aggregated and the luminance histograms of multiple right images may be aggregated for input to the formula [1] for generating respective aggregated contrast values. The image having a corresponding aggregated contrast value that is lower may be selected for compensation according to an example embodiment of the invention.

The contrast calculator and comparator 614 outputs an indication of which image was selected to the tone mapping function generator 616. The tone mapping function generator 616 receives the selection from the contrast calculator and comparator 614 and receives the luminance histograms from the memory 650 for generating a tone mapping function to be applied to the selected image for reducing the difference in contrast between the left and right images of the subject frame.

According to an example embodiment of the invention, the tone mapping function generator 618 generates a tone mapping function according to equation [3] described above. In an example embodiment, image information corresponding to multiple frames is used to generate the tone mapping function. In an example embodiment where multiple frames are used, in equation [3] the cumulative distribution function of the high contrast image would be the average cumulative distribution function of the images in the multiple frames corresponding to the non-selected image and the low contrast image would correspond to the selected image of the subject frame.

The image compensator 618 receives the tone mapping function from the tone mapping function generator 616 and receives pixel information corresponding to the selected left image or right image, directly or indirectly, from a left image generator 402 and a right image generator 404, respectively. The image compensator 618 generates and outputs compensated left image pixel information 620 or compensated right image pixel information 622.

In another example embodiment, the contrast calculator and comparator 614 selects both images for compensation and the tone mapping function generator 616 generates two tone mapping functions as described above regarding the system 400 in FIG. 4. The image compensator 618 receives the tone mapping functions from the tone mapping function generator 616, applies the first tone mapping function to pixel information corresponding to the left image of the subject frame for generating and outputting compensated left image pixel information 620 and applies the second tone mapping function to pixel information corresponding to the right image of the subject frame for generating and outputting compensated right image pixel information 622.

In an example embodiment the system 600 generates the tone mapping function based on pixel information corresponding only to the set of one or more frames preceding the subject frame. The tone mapping function based on frames preceding the subject frame may be generated while the pixel information corresponding to the subject is received, and thereby may improve system performance by not needing to perform the contrast calculations and generating luminance histograms relating to the images in the subject frame in advance of generating the compensated images corresponding to the subject frame.

In an example embodiment, the memory 650 functions as a first-in-first-out (FIFO) memory. The luminance histograms corresponding to the earliest frame in the set of frames are in effect replaced by the luminance histograms corresponding to the subject frame. The subject frame then becomes one of the frames in the set of frames when the next subject frame's image information is received.

Figure 7:
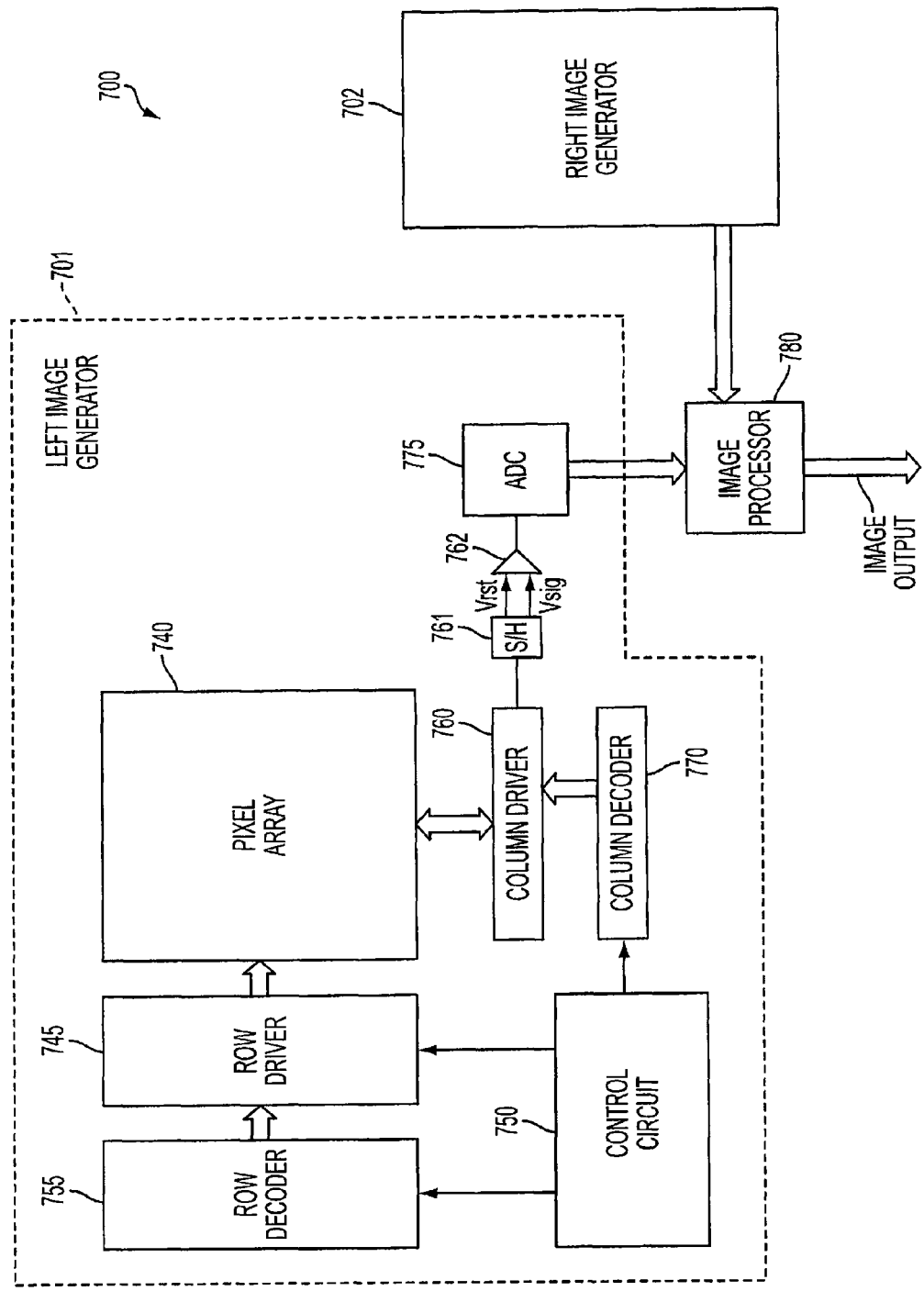
FIG. 7 shows a block diagram of an imager in accordance with an example embodiment of the invention.

FIG. 7 illustrates an exemplary imaging device 700 that may be used by an embodiment of the invention. The imaging device 700 includes a left image generator 701 and a right image generator 702. The left image generator 701 includes a pixel array 740. Row lines of the array 740 are selectively activated by a row driver 745 in response to row address decoder 755. A column driver 760 and column address decoder 770 are also included in the imaging device 700. The imaging device 700 is operated by the timing and control circuit 750, which controls the address decoders 755, 770. The control circuit 750 also controls the row and column driver circuitry 745, 760.

A sample and hold circuit 761 associated with the column driver 760 reads a pixel reset signal Vrst and a pixel image signal Vsig for selected pixels of the array 740. A differential signal (Vrst–Vsig) is produced by differential amplifier 762 for each pixel and is digitized by analog-to-digital converter 775 (ADC). The analog-to-digital converter 775 supplies the digitized pixel signals to an image processor 780 which forms and may output a digital image. The right image generator 702 may be identical to the left image generator 701. The image processor 780 may have a circuit that is capable of performing the methods described above for generating one or more compensated images.

Figure 8:
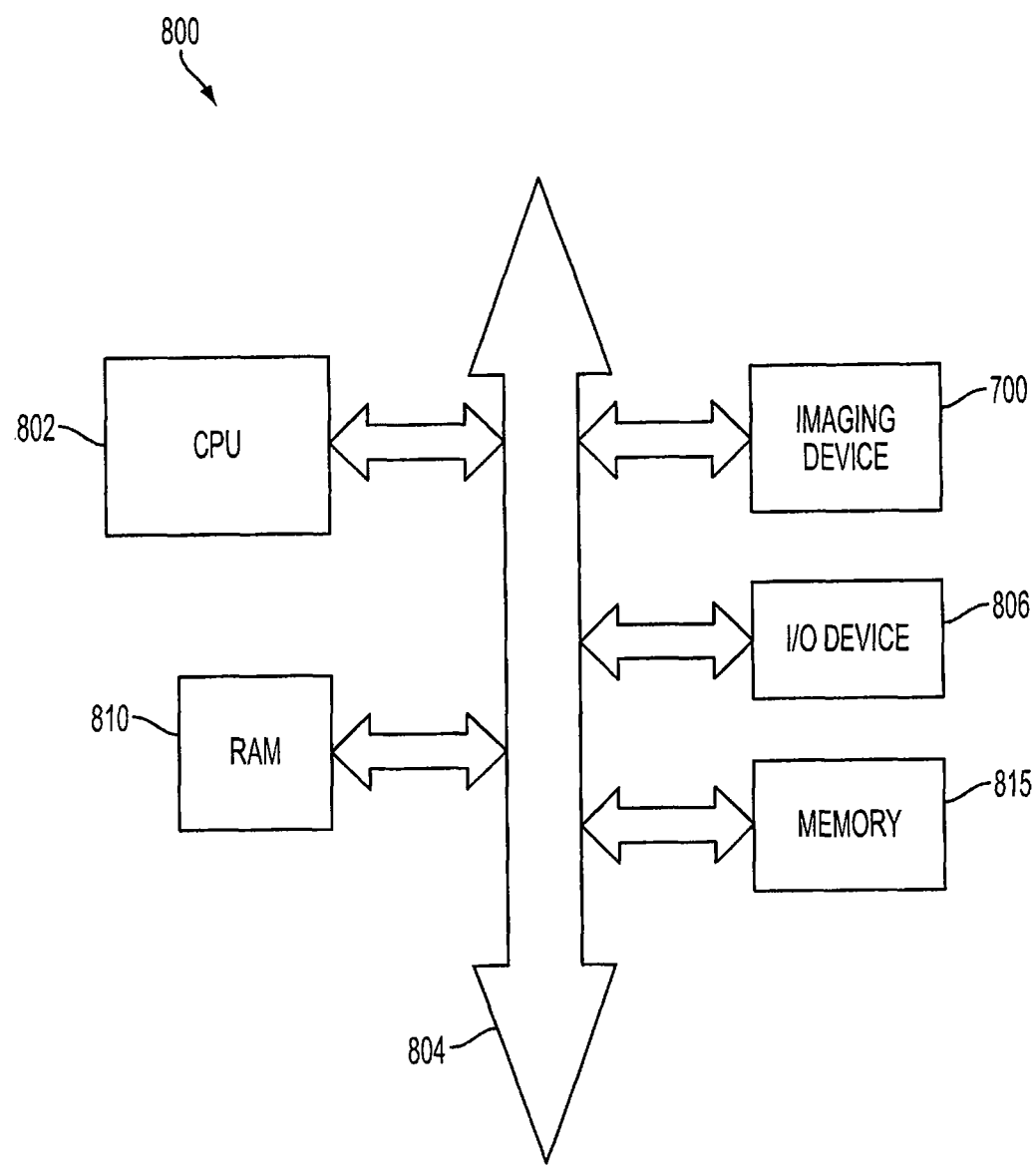
FIG. 8 shows a processor system incorporating at least one imaging device constructed in accordance with an example embodiment of the invention.

FIG. 8 shows system 800, a typical processor system modified to include the imaging device 700 (FIG. 7) of the invention. The system 800 is exemplary of a system having digital circuits that could include image sensor devices. Without being limiting, such a system could include a computer system, still or video camera system, scanner, machine vision, video phone, and auto focus system, or other imager applications.

System 800, for example a camera system, generally comprises a central processing unit (CPU) 802, such as a microprocessor, that communicates with an input/output (I/O) device 806 over a bus 804. Imaging device 700 also communicates with the CPU 802 over the bus 804. The processor-based system 800 also includes random access memory (RAM) 810, and can include non-volatile memory 815, which also communicate with the CPU 802 over the bus 804. The imaging device 700 may be combined with a processor, such as a CPU, digital signal processor, or microprocessor, with or without memory storage on a single integrated circuit or on a different chip than the processor.

In an example embodiment, the methods described above are performed "on-the-fly" on a frame by frame basis without advance calibration. In this manner, scene and system variation over time are taken into account on a per stereo image pair basis. The avoidance of advance calibration may result in reduced costs and may eliminate the need for periodic recalibration. In another example embodiment, the selection of which image to correct may be relatively fixed based on prior selection statistics. For example, if the left image is determined to have better quality in the last n frames (e.g., as may be the case when a camera used to generate the left image is found to have a higher quality than the camera used for the right image), the right image may thereafter by default be the image selected for compensation. In addition to reduced processing complexity by not determining which image to compensate on a frame-by-frame basis, this method may filter out the possible occasional anomaly resulting from an unusually complex scene. A system according to an example embodiment may include a customer configurable option to select between an "on-the-fly" system and a relatively fixed correction system.

In an example embodiment, the pixel information corresponding to an image is represented by X number of bits and the corresponding luminance histograms are generated based on gradations corresponding to a number of bits less than X. For example, the pixel information may be represented by 10 bits data. If the histogram is calculated in 10 bit linear space, it may be expensive for implementation in hardware. In an example embodiment, a 64-bin (i.e., 6 bits) histogram may be used to achieve results similar to that of a 1024-bin histogram. In an example embodiment, the histogram is calculated on edges defined as:

$$\text{edges} = (2^{10} - 1) \times \left[0, \frac{1}{n}, \frac{2}{n}, \frac{3}{n}, \ldots, \frac{n-1}{n}, 1\right]^{3/2} \quad (64)$$

$n$ = bin count

Once the tone matching function is generated based on the 64 bin histogram, it may be interpolated to 1024 steps to be applied to the image of the subject frame. In an example embodiment, the image compensator generates compensated image(s) information before gamma correction is performed.

It is a useful tool to improve stereo image quality. This algorithm is easy to implement and fit into the color pipeline. For low bit image data, it may lead to side effect of contouring, to overcome this shortcoming, the algorithm may be implemented in the pipeline position where high bit data is still available. For future work, dithering can be considered to be combined with this approach to minimize the contouring.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for processing a first image and a second image comprising:
   receiving first pixel information corresponding to the first image from a first image generator;
   receiving second pixel information corresponding to the second image from a second image generator;
   determining a first contrast value corresponding to only a portion of the first image based on the first pixel information;
   determining a second contrast value corresponding to only a portion of the second image based on the second pixel information;
   selecting one of the first and second images responsive to the first and second contrast values;
   generating a first tone mapping function based on the first and second contrast values for modifying contrast of the selected one of the first and second images, wherein the first and second contrast values are determined according to the following:

$$ContrastValue = -\text{sum}\left[\left(\frac{H(I)}{\text{sum}(H(I))}\right) * \log\left(\frac{H(I)}{\text{sum}(H(I))}\right)\right],$$

wherein "H" is the luminance channel histogram and "I" is the luminance channel image of the corresponding first or second image; and
   generating compensated image pixel information corresponding to the selected one of the first and second images by applying the first tone mapping function to the pixel information corresponding to the selected one of the first and second images.

2. The method of claim 1 comprising generating first and second luminance histograms corresponding respectively to the first and second images based on the respective first pixel information and second pixel information, wherein the first tone mapping function is generated based on the first and second luminance histograms.

3. The method of claim 2 wherein the first tone mapping function maps the luminance histogram of the selected image to the luminance histogram of the other image.

4. The method of claim 1 comprising:
   selecting both the first and second images responsive to the first and second contrast values;
   generating a second tone mapping function based on the first and second contrast values for modifying contrast of the image of the first and second images other than the selected one of the first and second images; and
   generating compensated image pixel information corresponding to the other image by applying the second tone mapping function to the pixel information corresponding to the other image.

5. The method of claim 1 comprising comparing the first contrast value to the second contrast value and selecting one of the first and second images having lower contrast.

6. The method of claim 1 wherein the first and second contrast values are determined based on a luminance determination of the respective first and second images.

7. The method of claim 1 comprising identifying an overlap region of the first and second images and the first and second contrast values are determined based on the respective overlap regions of the first and second images.

8. The method of claim 1 where the luminance of the first and second images is represented by X number of bits and the first and second luminance histograms are generated based on gradations corresponding to a number of bits less than X.

9. A method for adjusting contrast between left and right images of a stereoscopic image pair of a subject frame, where the subject frame is in a sequence of frames and follows a set of one or more frames and a memory stores a left luminance histogram and a right luminance histogram corresponding to left and right images of each frame of the set of frames, comprising:
   receiving from the memory the left and right luminance histograms for each frame in the set of frames;
   determining to compensate both the left image and the right image of the subject frame responsive to an aggregate of the left luminance histograms of the frames in the set of frames and an aggregate of the right luminance histograms of the frames in the set of frames;
   generating an intermediate luminance histogram corresponding to an intermediate contrast value between respective first and second contrast values of the left and right images for each frame in the set of frames;
   generating a tone mapping function based on the aggregate of the left luminance histograms of the frames in the set of frames, the aggregate of the right luminance histograms of the frames in the set of frames, and the intermediate luminance histogram;
   generating a left luminance histogram and a right luminance histogram for the respective left and right images of the subject frame; and
   generating a left compensated image and a right compensated image by applying the left tone mapping function to the left image and the right tone mapping function to the right image of the subject frame.

10. The method of claim 9 further comprising saving the left and right luminance histograms of the subject image in memory, replacing the left and right luminance histograms of an earliest frame in the set of frames.

11. The method of claim 9 where the left and right luminance histograms corresponding to the frames in the set of frames correspond to overlap regions of the respective left and right images.

12. The method of claim 9 further comprising:
   generating a left luminance histogram and a right luminance histogram for respective left and right images of a second subject frame; and
   generating a compensated image corresponding to the second subject frame by applying the tone mapping function to the left image or right image of the second subject frame respectively corresponding to the determined left image or right image.

13. The method of claim 9 wherein the set of frames consists of one frame.

* * * * *